(12) United States Patent
Hausmann et al.

(10) Patent No.: US 8,372,518 B1
(45) Date of Patent: Feb. 12, 2013

(54) ANTISTATIC STYRENIC POLYMER COMPOSITIONS AND ARTICLES THEREFROM

(75) Inventors: Karlheinz Hausmann, Auvernier (CH); Christina Troeltzsch, Old Bridge, NJ (US)

(73) Assignee: E I du Pont de Nemours and Company, Wilmington, DE (US)

( * ) Notice: Subject to any disclaimer, the term of this patent is extended or adjusted under 35 U.S.C. 154(b) by 286 days.

(21) Appl. No.: 12/633,157

(22) Filed: Dec. 8, 2009

Related U.S. Application Data

(63) Continuation-in-part of application No. 11/606,854, filed on Nov. 30, 2006, now abandoned.

(51) Int. Cl.
| | |
|---|---|
| *B32B 27/30* | (2006.01) |
| *B32B 27/32* | (2006.01) |
| *B29C 47/00* | (2006.01) |
| *C08K 5/05* | (2006.01) |
| *C08F 8/00* | (2006.01) |

(52) U.S. Cl. .................. 428/523; 524/388; 525/192
(58) Field of Classification Search .................. 525/192; 524/388; 428/523
See application file for complete search history.

(56) References Cited

U.S. PATENT DOCUMENTS

| | | | |
|---|---|---|---|
| 2004/0072486 A1* | 4/2004 | Moll | ................ 442/1 |
| 2005/0256268 A1 | 11/2005 | Chen | |

FOREIGN PATENT DOCUMENTS

| | | |
|---|---|---|
| JP | 10060186 A | 3/1998 |
| JP | 10193495 A | 7/1998 |
| JP | 11077928 | 3/1999 |
| JP | 2002-012722 | 1/2002 |
| JP | 08134295 B2 | 12/2003 |
| JP | 10060185 B2 | 12/2004 |
| WO | 9808901 A1 | 3/1998 |
| WO | 2005075556 A1 | 8/2005 |

OTHER PUBLICATIONS

English translation of JP 2002-12722 A, Nakada et al, Jan. 15, 2002.*

* cited by examiner

*Primary Examiner* — Mark Eashoo
*Assistant Examiner* — David Karst

(57) ABSTRACT

An antistatic styrenic polymer composition comprises 30 to 70 wt % of a styrenic polymer, 5 to 40 wt % of a potassium ionomer, 1 to 10 wt % of one or more polyols, and 2 to 20 wt % of an ethylene copolymer, based on the total weight of the styrenic polymer composition which has reduced dust absorption and improved mechanical performances. Also disclosed are articles made of the composition such as film or sheet including multilayer structure and items obtained by extrusion molding, coextrusion molding, injection molding, thermoform molding, compression molding or blow molding.

20 Claims, No Drawings

ANTISTATIC STYRENIC POLYMER COMPOSITIONS AND ARTICLES THEREFROM

This application is continuation-in-part of application Ser. No. 11/606,854, filed Nov. 30, 2006, now pending; the entire disclosure of which is incorporated herein by reference.

The invention relates to an antistatic polymer composition, a process therefor, and an article therewith.

BACKGROUND OF THE INVENTION

Styrenic polymers and especially acrylonitrile butadiene styrene (ABS)-based polymers are used in various applications such as for manufacturing light, rigid, molded products including luggage, appliance, and telephone housing, pipe, golf club, sporting helmet, automotive part, wheel cover, enclosure, protective head gear, cosmetic case, and toy. In general, polymer-based moldings readily generate static electricity and often collect dust from air while they are handled in storage, transported and used.

A common approach to improving the antistatic properties of thermoplastics involves using internal antistatic agents incorporated into the thermoplastic polymeric materials by compounding or extrusion prior to or during the manufacture of items, for example, by means of molding or film-forming processes. Such antistatic agents, including a broad range of chemical classes (e.g., ethoxylated amine chemicals and homopolymers and copolymers of ethylene oxide, esters of fatty acids, carbon black and surfactants), work by migrating to the external polymer surface of the manufactured articles. These antistatic agents are very volatile and form a continuous film on the external polymer surface of the manufactured item because of its limited compatibility with the polymer composition itself. Therefore, the further processability of the manufactured item can become problematic. For example, the surface of the manufactured item may become sticky or stained by bleeding of the antistatic agent, leading to an unaesthetic appearance. Subsequent processing on the manufactured item, such as printing, cannot be readily done because a certain time, up to one week, is required for allowing proper migration of the antistatic agents. During that time, problems related to the adhesion of the printing may arise due to dust accumulation on the surface of the article, so that an additional pre-treatment step to remove this dust before handling the article is required. Deterioration in time of the antistatic effect is also usually observed due to the fact that the antistatic agents are directly exposed to the external environment.

To prevent the accumulation of static charges on the surface of molded articles, films or sheets, as well as to improve the drawback of migrating antistatic agents, permanent antistatic agents have been developed. See, e.g., WO2005/075556, JP H10-193495A, JP H11-077928, JP H08-134295, JP H10-060185, and JP H10-060186.

Though compositions comprising potassium ionomers with or without polyols may have acceptable antistatic properties, such compositions have reduced mechanical properties including low impact strength, which can cause the brittleness of any article made of such compositions.

There is therefore a current need for styrenic polymer compositions having acceptable antistatic properties and reduced dust absorption while maintaining or even enhancing mechanical properties of the polymer.

SUMMARY OF THE INVENTION

The invention includes a composition comprising or being an antistatic blend wherein the blend comprises or is produced from a styrenic polymer, a potassium ionomer, one or more polyols, and an ethylene copolymer;

the styrenic polymer is present in the composition in the range of about 30 to about 70 weight % of the composition; the potassium ionomer is present about 5 to about 40 wt % of the composition and comprises at least one copolymer derived from ethylene and alkyl (meth)acrylate comonomer; the polyol is present in about 1 to about 10 wt % of the composition and comprises at least three, or four, hydroxyl moieties; and the ethylene copolymer is present in the composition about 2 to about 20 weight %.

DETAILED DESCRIPTION OF THE INVENTION

The styrenic polymer includes, but is not limited to, polystyrene, high impact polystyrene (HIPS), styrene acrylonitrile copolymer (SAN), α-methylstyrene acrylonitrile copolymers, acrylonitrile butadiene styrene copolymer (ABS), acrylonitrile butadiene α-methylstyrene copolymer, acrylonitrile styrene acrylate copolymer (ASA), methacrylate/butadiene styrene copolymer, styrene methyl methacrylate copolymer, and blends thereof and any of such polymers and copolymers blended with compatible rubber compositions such as polystyrene blended with a polybutadiene to which styrene has been grafted, styrene-acrylonitrile copolymer blended with a rubber selected from the group consisting of poly ($C_3$- to $C_{10}$-alkyl acrylate), polybutadiene and ethylene propylenediene copolymer rubber to which rubber styrene-acrylonitrile copolymer has been grafted, and styrene methyl methacrylate copolymer blended with a rubber selected from the above group of rubbers to which rubber styrene methyl methacrylate copolymer has been grafted, or combinations of two or more thereof. Preferably, the styrenic polymer is ABS, SAN, ASA, HIPS, or combinations of two or more thereof; or ABS, SAN, ASA, or combinations of two or more thereof. More preferably, the styrenic polymer is ABS. ABS is a heat-resistant and impact-resistant thermoplastic. The ABS can include from 15 wt-% to 35 wt-% acrylonitrile, 5 wt-% to 30 wt-% butadiene and 40 wt-% to 60 wt-% styrene, based on the total weight of the ABS. The ABS may combine the chemical resistance of the acrylonitrile, the rigidity of styrene with the toughness and impact resistance of polybutadiene. ABS polymers are commercially available under the trademark Novodur® from LANXESS AG.

The compositions exhibit greatly improved antistatic performance, especially at low relative humidity, but even at high relative humidity. At high RH, one expects that a humectant may not be necessary to achieve less than $10^{12}$ ohms/sq resistivity. For a 2-phase material such as the composition disclosed herein, resistivity depends on the composition's morphology, which is process related.

Ionomers are thermoplastic resins that contain metal cations in addition to the organic backbone of the polymer. Ionomers are ionic copolymers of an olefin such as ethylene with partially neutralized carboxylic acid.

The potassium ionomer is derived from an ethylene carboxylic acid copolymer where the carboxylic acid or a portion thereof is neutralized with potassium cation. The ethylene acid copolymer can comprise at least one E/X/Y copolymer. E is ethylene, X is an α,β-unsaturated $C_3$-$C_8$ carboxylic acid, Y is a softening comonomer including $C_{1-8}$ alkyl (meth)acrylate. X is 2 to 30 wt % of the E/X/Y copolymer, Y is 0 to 40 wt % of the E/X/Y copolymer, and the remainder is E. Generally about 10 to about 90% of the carboxylic acid is neutralized with potassium ions. Ionomer blends may further comprise optionally softening agents such as an alkyl (meth)acrylate providing "softer" resins (Y) which can be neutralized to form softer ionomers. The α,β-unsaturated $C_3$-$C_8$ carboxylic acid (X) of the potassium ionomer can be chosen among acrylic acid, methacrylic acid, fumaric acid, maleic acid monoethylester (e.g., maleic anhydride), or combinations of two or more thereof. From 10 to 90% of the acid moiety of the acid copolymer is neutralized by potassium cations and more preferably, from 50 to 90% of the acid moiety of the acid copolymer is neutralized by potassium cations. A partial amount of neutralizing potassium cations can be replaced by alkali metal ions, transition metal ions, alkaline earth metal ions, such as lithium, sodium, magnesium, calcium, zinc, or combinations of two or more thereof wherein potassium comprises a preponderance of the cations. That is, the equivalent percentage of potassium ions in the final potassium ionomer composition can be at least 50 mol equivalent %, 60 equivalent %, 70 equivalent %, 80 equivalent %, or even at least 90% based on the total salts or ions present in the composition. The equivalent percentage (%) is determined by multiplying the mol percentage (%) of the cation by the valence of the cation. The presence of potassium cations in the preferred ranges can provide antistatic properties to a component comprising such a composition due to the strong water absorption induced. The styrenic polymer composition according to the present invention comprises the potassium ionomer in an amount of 5 to 40 wt-% or 10 to 20 wt-%, the weight percentage being based on the total weight of the styrenic polymer composition. Potassium ionomers are commercially available under the trademark Entira™ AS from E. I. du Pont de Nemours and Company, Wilmington, Del. (DuPont).

To prevent the accumulation of static charges on the surface of molded articles, films or sheets, conventional practice adds ionomers to polymer compositions. Wishing not to be bound by theory, because potassium ionomers are non-migrating static inhibitors involving the absence of bleeding and interaction with product, label or print, they are chosen for improving antistatic properties of the styrenic polymer composition.

The composition can comprise one or more polyols in the range of 1 to 10 or 1 to 5 wt-% of the total weight of the styrenic polymer composition. Alternatively, the polyol is present in the composition at about 1.5%. Examples thereof include polyoxy alkylene glycols, such as polyethylene glycol of various molecular weights, polypropylene glycol, polyoxyethylene polyoxypropylene glycol, glycerol, diglycerol, polyglycerol, hexanetriol, pentaerythritol, sorbitol, or combinations of two or more thereof. Polyglycerol means a n-polymer of glycerol wherein n is at least three. The polyols are preferably glycerol, diglycerol, hexanetriol, pentaerythritol, polyglycerols, sorbitol, or combinations of two or more thereof.

The polyols can be combined with the styrenic polymer either separately or in form of a preblend with the potassium ionomer. The preblend described above can be prepared by blending the potassium ionomer and the one or more polyols together by using any melt-mixing method known to one skilled in the art and is then processed into pellets. The preparation of such pellets is described in JP H08-134295. Glycerol preblends with potassium ionomer are commercially available under the trademark Himilan® or Entira™ AS from DuPont-Mitsui Polychemical Co., Ltd., Tokyo, Japan.

Ethylene alkyl (meth)acrylate copolymers can be used in the compositions to confer improved impact strength. The composition can comprise ethylene alkyl (meth)acrylate copolymer in an amount of 2 to 20 wt-%, 7 to 20 wt-%, or 7 to 10 wt-%, based on the total weight of the styrenic polymer composition. An ethylene (meth)acrylate copolymer preferably does not include repeat units derived from maleic acid monoester, maleic acid diesters, (meth)acrylic acid, maleic acid, itaconic acid, fumaric acid, fumaric acid monoester, and salts thereof, but may include repeat units derived from additional non-acidic comonomer such as carbon monoxide, sulfur dioxide, acrylonitrile, glycidyl acrylate, glycidyl methacrylate, glycidyl vinyl ether, or combinations of two or more thereof. An ethylene (meth)acrylate copolymer can include ethylene alkyl (meth)acrylate dipolymer such as ethylene methylacrylate dipolymer, ethylene methacrylate dipolymer, ethylene ethylacrylate dipolymer, ethylene n-butyl-acrylate dipolymer, or combinations of two or more thereof and more preferably, the ethylene alkyl (meth)acrylate copolymer is the ethylene methyl-acrylate dipolymer. The alkyl (meth)acrylate can be present in an amount of 5 to 40 wt-% or 20 to 35 wt-%, based on the total weight of the ethylene alkyl (meth) acrylate copolymer. Suitable ethylene alkyl (meth)acrylate copolymers for use in the present invention are commercially available under the trademark Elvaloy® AC from DuPont.

The composition may further include, from about 0.001 to about 10 wt %, modifiers and other additives, including, without limitation, antioxidants, lubricants, foaming agents, UV light stabilizers, coloring agents, pigments, fillers, flame retardants, reinforcing agents, processing aids, or combinations of two or more thereof.

The composition can be prepared by blending the styrenic polymer, the potassium ionomer, the polyol, and optionally the ethylene alkyl (meth)acrylate copolymer, or by blending the styrenic polymer, the polyol preblend with potassium ionomer, and optionally the ethylene alkyl (meth)acrylate copolymer until they are homogeneously dispersed to the naked eye and do not delaminate upon extrusion. Other materials (e.g. modifiers or additives) may be also uniformly dispersed in the styrenic polymer-potassium ionomer-polyols-ethylene alkyl (meth)acrylate matrix. The blend may be obtained by combining the ingredients described above by using any melt-mixing method known in the art. For example, the component materials may be mixed using a melt-mixer such as a single or twin-screw extruder, blender, kneader, Haake mixer, Brabender mixer, Banbury mixer, roll mixer to give the styrenic polymer composition. Alternatively, a portion of the component materials can be mixed in a melt-mixer, and the rest of the component materials subsequently added and further melt-mixed. It is preferred that the potassium ionomer and a polyol such as diglycerol are first mixed, subsequently dry blended with the styrenic polymer and the ethylene alkyl-acrylate copolymers through, for example, extrusion molding, coextrusion molding, extrusion lamination, extrusion coating, cast film extrusion, blown film extrusion. Of note is a process comprising adding the diglycerol as a solution in water to a potassium ionomer in an extruder or other mixing equipment and subsequently removing the water (for example, by evaporation such as from a vacuum port on an extruder) to produce a potassium ionomer-diglycerol mixture. Of note is the process that further comprises processing the potassium ionomer-diglycerol mixture into pellets, optionally dry blending the pellets of the potassium ionomer-diglycerol mixture with pellets of styrenic polymer to form the styrenic polymer composition of the invention and processing the mixture into a finished product.

In another aspect, the present invention relates to an article made of the composition of the invention. The article can be a film, a sheet, a multilayer structure, or items obtained by extrusion molding, coextrusion molding, injection molding, thermoform molding, compression molding or blow molding.

The composition can be used in multilayer structures to impart their antistatic properties and good mechanical performances. In this case, the composition can be used as a surface layer (a layer of which only one face of the layer contacts another layer; the outermost layer) or as an intermediate layer (a layer of which both faces of the layer contact another layer) of the multilayer structure, in which the composition of the present invention provides a "hidden" antistatic layer.

Another example of an article made of the composition of the present invention is a cosmetic case. In the specific application of packaging eye shadows or face powders, for example, in cosmetic cases, the accumulation of static charges leads to dust and powder adhesion to the packaging material which leads to a dirty aspect and to unaesthetic appearance. Consequently, the composition is an answer to overcome this dust adhesion drawback by keeping at the same time excellent mechanical properties.

Another example of an article made of the composition of the present invention is the housing or other parts of household appliances like, for example, handles for electric irons, housings for hair dryers, vacuum cleaners, kitchen appliances, telephones, food serving trays or coffee machine housings.

The invention will be further described in the examples below, which are not to be construed as to limit the scope of the invention.

Example

The following materials were used for preparing the polymer composition according to the present invention:
Acrylonitrile butadiene styrene (ABS): Novodur® P2H-AT 792 from LANXESS AG.
KI (Potassium ionomer): Entira™ AS from DuPont, which was a potassium ionomer E/X/Y wherein E was ethylene, X was methacrylic acid in an amount of 14.9 wt-% and Y was methyl acrylate in an amount of 0.9 wt-%; the combined acid moieties were neutralized to 84.8% with K cations. The MFI (Melt Flow Index, measured at 190° C. and 2.16 kg) was 1.
KI-G: Himilan® from Mitsui DuPont Poly Chemical Co., Ltd., which is a glycerol preblend with (a) potassium ionomer which consisted of a potassium ionomer E/X, wherein, E was ethylene, X was methacrylic acid in an amount of 12.5 wt-%; the acid moieties were neutralized to 82% with potassium cations and (b) 5 wt-% of glycerol. The MFI was 1.
KI-DG: a diglycerol preblend with potassium ionomer consisting of (a) a potassium ionomer same as Entira™ AS disclosed above and (b) 8 wt-% of diglycerol.
Elvaloy® AC: an ethylene methyl-acrylate copolymer comprising 30 wt-% of methyl-acrylate and a MFI of 3.

Samples E1 and E2 and comparative examples (C0-C4) were prepared by feeding a salt and pepper blend of the components into a Haake Mixer (capacity of 200 g) and subsequently intensively mixing such blends for 15 min at 200° C. before discharging it. The compositions of the samples are shown in Table 1.

Plaques of a thickness of 3 mm made of the samples were then prepared on a Collin No 201 Hydraulic Press (supplied by Dr. Collin GmbH, DE) at 220° C. Then, the testing samples were cut with a puncher from the compression molded plaques. The specimens were conditioned for one week at 23° C. and 50% relative humidity before measuring their electrical properties.

Antistatic properties are expressed by surface resistivity and static decay. Surface resistivity was measured according to ASTM D257. Static decay was measured according to the U.S. federal test method No 101 B, where a voltage of 5000V was applied and the voltage drop speed down to 500V was measured.

Mechanical properties are expressed by the impact strength which is quantified by Charpy notched impact. Impact strength was measured according to ISO 179/1eA. Results are shown in Table 2.

TABLE 1

| Example | Antistatic agent* | ABS | Impact modifier (Elvaloy ® AC) |
|---|---|---|---|
| C0 | — | 100 | — |
| C1 | KI | 80 | — |
| C2 | KI | 70 | 10 |
| C3 | KI-G | 80 | — |
| E1 | KI-G | 70 | 10 |
| C4 | KI-DG | 80 | — |
| E2 | KI-DG | 70 | 10 |

*Antistatic agent was present in 20 wt %, except C0, which had no antistatic agent.

TABLE 2

| | Antistatic properties | | | Mechanical properties |
|---|---|---|---|---|
| | Surface | 10% decay time[b] | | Notched Charpy |
| Example | resistivity[a] | +5000 V | −5000 V | test energy[c] |
| C0 | $3.38 \times 10^{14}$ | >60 | 0.01 | 47 |
| C1 | $4.70 \times 10^{10}$ | 0.01 | 0.01 | 16 |
| C2 | $2.07 \times 10^{9}$ | 0.01 | 0.01 | 11 |
| C3 | $3.76 \times 10^{11}$ | 0.01 | 0.01 | 10 |
| E1 | $1.88 \times 10^{10}$ | 0.01 | 0.01 | 42 |
| C4 | $5.64 \times 10^{9}$ | 0.01 | 0.01 | 18 |
| E2 | $7.52 \times 10^{8}$ | 0.01 | 0.01 | 52 |

[a]measured as [Ohms/sq] according to ASTM D257
[b]measured as [s] according to U.S. Fed. Std. 101B
[c]measured as [kJ/m$^2$] according to ISO 179/1eA.

As shown in Table 2, the Examples comprising a potassium ionomer-based antistatic agents (C1-C4, E1 and E2) had up to a six order of magnitude improved surface resistivity in comparison with the sample made of ABS (C0). The addition of an ethylene alkyl-acrylate copolymer to the polymer composition comprising a potassium ionomer with or without polyol (C2, E1 and E2) led to a one order of magnitude improvement of the antistatic properties in comparison with the same composition without the impact modifier (C1, C3 and C4). The styrenic polymer compositions comprising a potassium ionomer-based antistatic agent had good charge decay characteristics and dust-free characteristics preventing from adhesion of dust and powders due to static charge buildup. The compositions further comprising polyols (C3, C4, E1 and E2) presented values of 10% decay time of 0.01 seconds (in comparison with a 10% decay time of 60 seconds for the sample C0). 10% decay time was a common way to analyze the electrical properties of any samples. Values of 10% decay times which were less than 1 second meant that static buildup and dust attraction did not occur. Consequently, the styrenic polymer compositions comprising a potassium ionomer and one or more polyols antistatic agent had excellent dust-free characteristics.

The impact strength test is a method for evaluating the relative toughness of materials. It is defined as the energy per unit area required to break a test specimen by the impact of a heavy pendulum hammer. The energy lost by the pendulum is equated with the energy absorbed by the test specimen: tough materials absorb a lot of energy when fractured (meaning high values of Charpy notched) whereas brittle materials absorb very little energy. The addition of any potassium ionomer-based, i.e. with or without polyols, antistatic agent to styrenic polymer compositions led to an important decrease of impact strength (C1, C3 and C4) in comparison with sample C0 (100 wt-% ABS), and consequently, articles made of such compositions are brittle. Indeed, the Charpy notched values of ABS compositions comprising a potassium ionomer with or without polyols are at least 2.5 times lower (C1, C3 and C4) in comparison with the sample made of 100 wt-% ABS (C0).

The addition of an ethylene alkyl (meth)acrylate to a styrenic polymer composition without polyol (C2) did not have any significant influence on the impact strength of the sample itself. On the contrary, and surprisingly, the addition of an ethylene alkyl-acrylate copolymer to styrenic polymer compositions comprising a potassium ionomer and one or more polyols antistatic agents (E1 and E2) led not only to an improvement in the antistatic properties but also to a considerable improvement of the Charpy notched impact strength. The addition of an ethylene alkyl (meth)acrylate copolymer to styrenic polymer compositions comprising a potassium ionomer and one or more polyols antistatic agents (E1 and E2) conferred to the compositions themselves similar or even better impact strength than that of sample C0 (100 wt-% ABS) without significant negative effect on the antistatic properties.

Compositions E1 and E2 had good decay and dust-free characteristics that allowed any molded article made of such compositions to be protected from dust and powders adhesion. Furthermore, the styrenic polymer compositions (E1 and E2) had comparable or even improved mechanical properties in comparison with ABS-based compositions which, on the other hand, are known to have good rigidity, toughness and impact resistance.

The invention claimed is:

1. An article comprising a surface layer wherein
   the surface layer is an antistatic layer and comprises or is produced from a composition;
   the composition comprises an antistatic blend;
   the blend comprises or is produced from a styrenic polymer, a potassium ionomer, one or more polyols, and an ethylene copolymer;
   the styrenic polymer is present in the composition in the range of about 30 to about 70 weight % of the composition;
   the potassium ionomer is present about 5 to about 40 wt % of the composition and is derived from an ethylene carboxylic acid where about 10 to about 90% of the carboxylic acid is neutralized with potassium cations;
   the polyol is present in about 1 to about 10 wt % of the composition and comprises at least three hydroxyl moieties;
   the ethylene copolymer is present in the range of about 2 to about 20 wt % of the composition and is an ethylene alkyl (meth)acrylate copolymer; and
   all ethylene alkyl (meth)acrylate copolymers that are present in the composition do not contain repeat units derived from a comonomer having an acidic or anhydride functionality.

2. The article of claim 1 wherein the potassium ionomer is present in the composition from 10 to 20 wt %.

3. The article of claim 2 wherein the polyol is present in the composition from 1 to 5 wt %.

4. The article of claim 3 wherein the ethylene copolymer is present in the composition from 7 to 10 wt %.

5. The article of claim 4 wherein the styrenic polymer is acrylonitrile butadiene styrene copolymer; the article is a molded article; and the surface layer is a film or sheet.

6. The article of claim 5 wherein the polyol is glycerol, diglycerol, or combinations thereof.

7. The article of claim 2 wherein the ethylene copolymer is present in the composition from 7 to 20 wt %.

8. The article of claim 2 wherein the styrenic polymer includes acrylonitrile butadiene styrene copolymer, styrene acrylonitrile copolymer, acrylonitrile styrene copolymer, or combinations of two or more thereof; the article is a molded article; and the surface layer is a film or sheet.

9. The article of claim 8 wherein the polyol includes glycerol, diglycerol, hexanetriol, pentaerythritol, polyglycerol, sorbitol, or combinations of two or more thereof.

10. The article of claim 9 wherein the ethylene copolymer is an ethylene alkyl (meth)acrylate dipolymer.

11. The article of claim 9 wherein the ethylene copolymer contains from 20 to 35 wt-% of alkyl (meth)acrylate and the alkyl group of the ethylene copolymer is methyl, ethyl, n-butyl, or combinations of two or more thereof.

12. The article of claim 11 wherein the ethylene copolymer is ethylene methylacrylate dipolymer, ethylene methacrylate dipolymer, ethylene ethylacrylate dipolymer, ethylene n-butyl-acrylate dipolymer, or combinations of two or more thereof.

13. The article of claim 12 wherein the ethylene copolymer is the ethylene methylacrylate dipolymer.

14. The article of claim 1 wherein the ethylene copolymer is present in the composition from 7 to 20 wt %.

15. An article comprising or produced from a composition wherein
   the article is an extruded article, a thermoformed article, or a molded article;
   the composition comprises or is produced from a styrenic polymer, a potassium ionomer, one or more polyols, and an ethylene copolymer;
   the styrenic polymer is present in the composition in the range of about 30 to about 70 weight % of the composition;
   the potassium ionomer is present about 5 to about 40 wt % of the composition and is derived from an ethylene carboxylic acid where about 10 to about 90% of the carboxylic acid is neutralized with potassium cations;
   the polyol is present in about 1 to about 10 wt % of the composition and comprises at least three hydroxyl moieties;
   the ethylene copolymer is present in the range of about 2 to about 20 wt % of the composition and is an ethylene alkyl (meth)acrylate copolymer; and
   all ethylene alkyl (meth)acrylate copolymers that are present in the composition do not contain repeat units derived from a comonomer having an acidic or anhydride functionality.

16. The article according to claim 15 wherein
   the styrenic polymer includes acrylonitrile butadiene styrene copolymer, styrene acrylonitrile copolymer, acrylonitrile styrene copolymer, or combinations of two or more thereof;
   the polyol includes glycerol, diglycerol, hexanetriol, pentaerythritol, polyglycerol, sorbitol, or combinations of two or more thereof; and
   the ethylene copolymer is ethylene methylacrylate dipolymer, ethylene methacrylate dipolymer, ethylene ethylacrylate dipolymer, ethylene n-butyl-acrylate dipolymer, or combinations of two or more thereof.

17. The article according to claim 16 wherein the ethylene copolymer is the ethylene methylacrylate dipolymer.

18. The article according to claim 15 wherein the styrenic polymer is acrylonitrile butadiene styrene copolymer, the polyol is diglycerol, and the composition comprises from 10 to 20 wt % of the potassium ionomer.

19. The article according to claim 18 wherein the article is a part of household appliances or a cosmetic case.

20. The article according to claim 19 wherein the article is the part of household appliances and is housing.

* * * * *